Patented Aug. 4, 1931

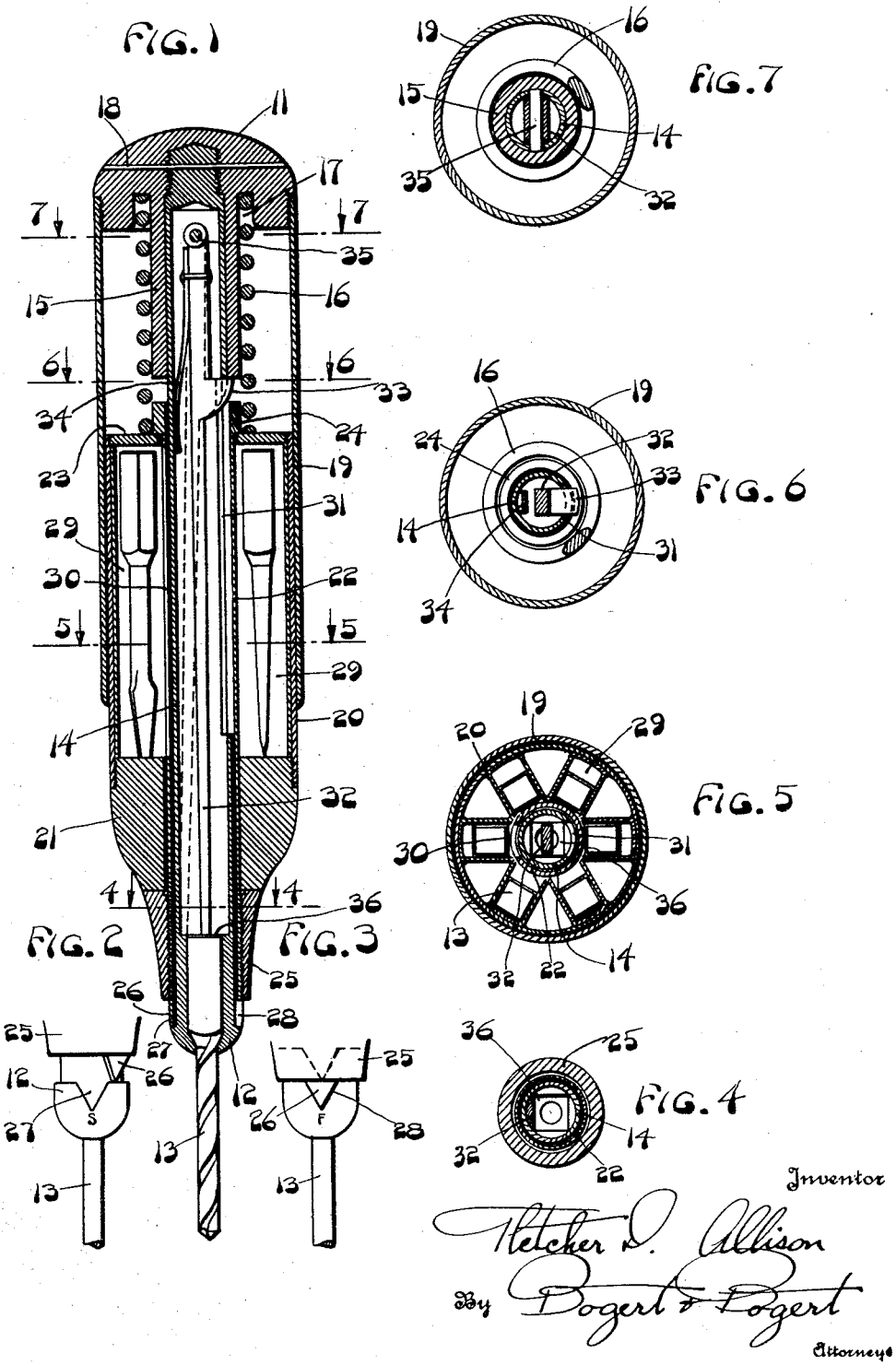

1,816,812

UNITED STATES PATENT OFFICE

FLETCHER D. ALLISON, OF COLUMBUS, OHIO

COMBINATION TOOL

Application filed September 2, 1930. Serial No. 479,266.

This invention relates especially to a tool of the type employing a handle in which a number of tool bits are encased, with a suitable chuck for holding the bit selected from those contained within the handle. Generally speaking, this type of tool is well known and is embodied in one of several shapes and designs which render the tool most easily handled for the type of tool elements contained within its handle.

As objects of the invention I am about to describe, I have incorporated features which permit of the selection, at will, of the tool it is desired to use for the work to be done, without having to remove the tool element from the handle, without having to touch the element to place it in the chuck or to remove it therefrom, and without having to resort to any operation occasioning the removal or replacement of parts of the tool, or the screwing, unscrewing, loosening or tightening of any element or elements essential to the preparation of the tool for use or for the proper storage of the tool bits within the handle after they have been used.

These and other objects are attained in the tool described in the following specification and illustrated in the accompanying drawings, in which:—

Fig. 1 is a sectional elevation of a tool embodying my invention, and in condition for use.

Fig. 2 is a detail fragmental view showing the initial movement necessary to prepare my improved tool for the use of one of its contained tool bits.

Fig. 3 is a view similar to Fig. 2, but showing the second movement necessary to condition my improved tool for use.

Fig. 4 is a transverse sectional view taken on the line 4—4 of Fig. 1, no tool bit being shown and other parts being shown in different positions.

Fig. 5 is a transverse sectional view taken on the line 5—5 of Fig. 1.

Fig. 6 is a transverse sectional view taken on the line 6—6 of Fig. 1.

Fig. 7 is a transverse sectional view taken on the line 7—7 of Fig. 1.

My improved tool is embodied in a form which is a cylindrical handle shape of convenient size, having a head 11 which is preferably rounded for comfort to the palm of the hand, with a chuck 12 at the opposite end for the tool bit 13 which it is to hold. This chuck may either be fastened to or made integral with a centrally located tube 14 which extends the entire length of the tool and, at its head end, is provided with a screw thread which permits of its being fastened solidly to the head 11 of the tool, an integral head sleeve 15 extending from the tool head 11, encasing the tube as shown, and acting as a guide for an actuating spring 16 which seats within an annular recess 17 of the head 11. A pin 18 extending through the head 11 and solid end of tube 14, secures the head and tube against relative movement. To the screw threaded rim of head 11 I have attached, as by screw threads, a body or casing 19.

This casing 19 encloses a secondary casing 20 which is slidably mounted within casing 19. To the end of sliding casing 20 adjacent to the clutch end of the tool, a tool selecting grip element 21 is attached. This grip is rotatively mounted on a tube 22 which is rotatively mounted on tube 14. At the upper end of sliding casing 20 an end plate 23 is fastened, this also being mounted to rotate upon tube 22 with grip 21 and casing 20. The upper end 24 of tube 22 is enlarged to form a shoulder against which plate 23 will bear for rotation, while to the lower end of tube 22 is fastened a feeding and chuck controlling grip 25. The lower end of tube 22 has an extending index finger 26 which, when grip 25 is rotated, as will be described, may be brought to occupy one or the other of two notches 27 and 28 in the shouldered end of clutch 12, for a purpose which will also be described. The lower end of spring 16 bears upon plate 23 so that normally the sliding casing and its assembled elements will be held yieldingly in the position shown in Fig. 1. In such a position the space between the upper end 24 of tube 22 and the lower end of head sleeve 15, is the distance of movement required by casing 20 to operate the tool, as will be described.

Within casing 20 I have arranged a series of tool bit compartments 29, which, at their inner sides, adjacent to tube 22, are open for their entire length from selecting grip 21 to plate 23, being closed only by tube 22 which lies against their open sides. However, in tube 22 there is an opening or port 30 which extends the entire length of each compartment and is of the width of each compartment so that when the tube is rotated by means of chuck grip 25, port 30 may be brought to open any one of the compartments desired, in order to select the tool wanted. Now, even with this port 30 having been provided for any one of the compartments, no access could be had to the center of tube 14 because of its wall blocking passage of the bit. Therefore, I have equipped tube 14 with a port 31 which is of the same width as port 30 so that proper registration of the ports and any desired one of the bit compartments may be accomplished to permit the tool bit to drop into the center of tube 14. Port 31 preferably extends upwardly to head sleeve 15 so that a bit locking and releasing bar 32, which is pivoted at 35, may be rendered accessible for operation. For this purpose bar 32 is preferably equipped with a lug 33 which extends through port 31 and has a cam shaped under face for engagement and cooperation with the upper end 24 of tube 22 so that upward movement of end 24 will cause the lug 33 to push bar 32 from the full line to the dotted line position shown. To return bar 32 to full line position as end 24 is allowed to move away from sleeve 15 under pressure of spring 16, I have provided a spring 34 which pushes the bar back to full line position. Thus may the chuck opening 36 first be made accessible for the bit it is to receive and then blocked to prevent inadvertent displacement of the bit therefrom as the tool is used.

In the use of my improved tool, its compartments 29 having been loaded with tool bits at the time of assembly, it is but necessary to lift chuck grip 25 until finger 26 has been moved from notch 27, marked "S" or "Shut", in Fig. 2, to permit the grip to be rotated to bring the finger to occupy notch 28, marked "F" or "Feed", in Fig. 3, as suggested in dotted and full lines in Fig. 3. This causes ports 30 and 31 to be registered, ready for bit feeding operation. Then selecting grip 21 is rotated until the compartment which contains the desired bit is in alignment with the notch "F". Such a position of the compartment containing the desired bit, is readily determined by suitable words or other symbols in the metal of grip 21 or of casing 20.

After such a selection of bits and conditioning of the tool has been made, it is a simple matter to hold the tool inclinedly downward with index finger 26 on the upper side, and at the same time draw back on casing 20 until tube end 24 causes cam lug 33 to push bar 32 back to dotted line position, at which time the selected bit drops from its compartment into tube 14 and enters chuck 36 of the tool, as shown in Fig. 1. Then the casing is released so that bar 32 moves to full line position, thereby locking the bit, as shown.

Reversal of the operation just described, consists in first holding the tool inclinedly upwardly with the index finger on the underside of chuck 12. Then, by drawing upon casing 20, the tool bit lock bar 32 is moved to dotted line position, thereby allowing the bit to slide from the chuck, into tube 14 and through ports 30 and 31, into position within the empty compartment. The mere movement of chuck 25 to bring index finger 26 from the "F" position of Fig. 3 to the "S" position of Fig. 2, will effectually stop all movements of bits to chucked position, thereby locking the tool against use of its bits until desired. In this condition the tool may be carried from place to place without the bits being lost or likely to become damaged because they were not properly contained within the tool.

Having thus described my invention what I claim is:

1. A combination tool comprising a hollow handle, a bit magazine mounted for reciprocatory movement in the handle, a tube within the magazine and mounted to permit movement of the magazine thereon, and a bar in the tube adapted to function to release tool bits from the magazine upon reciprocatory movement of the magazine.

2. A combination tool comprising a hollow handle, a bit magazine mounted for reciprocatory movement in the handle, a tube within the magazine and secured to the handle, a bit chuck in the tube, and a movable bar adjacent to the chuck functioned by movement of the magazine to lock bits in the chuck and released them therefrom.

3. A combination tool comprising a hollow handle, a bit magazine mounted for reciprocation in the handle, a chuck to receive bits from the magazine, a tube to convey bits to and from the magazine and chuck, and means functioning locking and releasing of the bits in the chuck when the magazine is reciprocated.

4. A combination tool comprising a hollow handle, a bit magazine mounted for reciprocation relatively to the handle, a chuck to receive bits from the magazine, a tube to convey bits to and from the magazine and chuck, and a bit locking and releasing bar operated by movements of the magazine and cooperating with the chuck and magazine, whereby bits may be released from the magazine, locked in the chuck, released from the chuck and locked in the magazine.

5. A combination tool comprising a hollow handle, a bit magazine mounted for reciprocation and rotation relatively to the handle, a chuck to receive bits from the magazine, a ported tube to convey bits to and from the magazine and chuck, and a locking bar movable upon reciprocation of the magazine to permit feeding of bits from and to the magazine and to lock and unlock the chuck.

6. A combination tool comprising a hollow handle, a bit magazine having bit compartments and mounted for reciprocation and rotation relatively to the handle, a ported sleeve within and movable relatively to the magazine to open any selected one of the magazine compartments, a chuck to receive bits from the magazine, a second ported tube to receive bits for delivery to or from the magazine and chuck, and means associated with the chuck and magazine, adapted to lock and unlock bits in the chuck and upon reciprocation of the magazine to permit feeding of a bit from the magazine after the magazine, the sleeve, and tube are brought to register the ports and the compartment containing the desired bit.

In testimony whereof I hereto affix my signature.

FLETCHER D. ALLISON.